(12) United States Patent
Abdulkhair et al.

(10) Patent No.: US 12,534,364 B1
(45) Date of Patent: Jan. 27, 2026

(54) NANOCOMPOSITE FOR HYDROGEN GENERATION

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Nady Abd El-Hameed Ibrahim, Riyadh (SA); Mohamed Khairy Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 4 days.

(21) Appl. No.: 19/062,495

(22) Filed: Feb. 25, 2025

(51) Int. Cl.
C01B 3/06 (2006.01)
B01J 27/20 (2006.01)
B01J 27/24 (2006.01)
B01J 35/00 (2006.01)
B01J 35/45 (2024.01)
B01J 35/61 (2024.01)
B01J 35/63 (2024.01)
B01J 35/64 (2024.01)
B01J 35/69 (2024.01)
B82Y 30/00 (2011.01)

(52) U.S. Cl.
CPC ............... C01B 3/065 (2013.01); B01J 27/20 (2013.01); B01J 27/24 (2013.01); B01J 35/19 (2024.01); B01J 35/45 (2024.01); B01J 35/613 (2024.01); B01J 35/633 (2024.01); B01J 35/643 (2024.01); B01J 35/647 (2024.01); B01J 35/69 (2024.01); B01J 2235/15 (2024.01); B01J 2235/30 (2024.01); B82Y 30/00 (2013.01); C01B 2203/1023 (2013.01); C01B 2203/1047 (2013.01); C01B 2203/1614 (2013.01)

(58) Field of Classification Search
None
See application file for complete search history.

(56) References Cited

FOREIGN PATENT DOCUMENTS

| CN | 109701579 A | * | 5/2019 |
| CN | 117585642 A | | 2/2024 |
| KR | 10-2462120 B1 | | 11/2022 |
| WO | 2023/102584 A1 | | 6/2023 |

OTHER PUBLICATIONS

Machine translation of Wang et al., CN 109701579A (Wang) (Year: 2019).*

(Continued)

Primary Examiner — Keling Zhang
(74) Attorney, Agent, or Firm — Oblon, McClelland, Maier &Neustadt, L.L.P.

(57) ABSTRACT

A method of hydrogen generation includes contacting sodium borohydride ($NaBH_4$) and a nanocomposite containing graphitic $C_3N_4$, $Fe_2O_3$, and $MgAl_2O_4$ in a mass relationship to each other in a range of from 5 to 15: 2 to 7: 75 to 95, at a temperature in a range of from 10 to 80° C., thereby catalyzing the hydrogen generation.

15 Claims, 4 Drawing Sheets

(56) References Cited

OTHER PUBLICATIONS

Majed Alshammari, et al., "Hydrogen catalytic performance of hybrid Fe3O4/FeS2/g-C3N4 nanocomposite structures", Diamond and Related Materials, vol. 138, Jul. 22, 2023, 110214, 9 pages.
Min Zhu, et al., "Effects of supports on reduction activity and carbon deposition of iron oxide for methane chemical looping hydrogen generation", Applied Energy, vol. 225, May 26, 2018, pp. 912-921, 9 pages.

* cited by examiner

NANOCOMPOSITE FOR HYDROGEN GENERATION

BACKGROUND

Technical Field

The present disclosure is directed towards nanohybrids for hydrogen generation, and more particularly, relates to a method of hydrogen generation using g-$C_3N_4$, $Fe_2O_3$, and $MgAl_2O_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In recent years, tremendous industrialization and population increases have led to a search for alternate energy sources to meet the expanding energy demand. Primarily, the depletion of non-renewable energy resources and environmental concerns compel societies to switch to clean, renewable energy sources soon. Although generating energy from the sun is cheap, the storage of this energy costs money because people have to rely on battery storage, which can be replaced repeatedly, is expensive, and is difficult to dispose of safely.

On the other hand, hydrogen energy is cleaner and has several advantages over battery systems: it is 100% clean, has extended life storage, and unlimited production and storage. Hydrogen energy has several advantages over batteries when saving energy and powering various applications. Here are some key benefits, including the fact that $H_2$ has a higher energy density than most batteries, meaning it can store more energy in a smaller volume, making it ideal for applications like transportation, where weight and space are critical. Refueling a hydrogen vehicle can take just a few minutes, similar to traditional gasoline vehicles, whereas charging batteries can take much longer. $H_2$ fuel cells can provide longer ranges than battery electric vehicles, making them suitable for heavy-duty applications and long-distance travel. Further, they are lighter than the equivalent battery systems for large-scale applications, such as trucks or ships, which is crucial for efficiency and payload capacity. $H_2$ production can be scaled up from renewable sources (like electrolysis using solar or wind power), potentially leading to sustainable and large-scale energy storage solutions.

Unlike batteries, which degrade over time and require replacement, hydrogen systems can maintain performance over a longer lifespan with proper maintenance. Also, $H_2$ can be used in various sectors beyond transportation, such as industrial processes, heating, and energy storage, providing versatility in energy solutions. Hydrogen can store excess renewable energy for long periods, helping to balance supply and demand in the energy grid. Further, hydrogen can offer a clean energy alternative when produced from renewable sources, emitting only water vapor when used in fuel cells, and can help stabilize the electrical grid by acting as a flexible energy storage solution, absorbing excess energy during peak production times.

Research has been conducted, e.g., by *Sust. Energy Techn. Assess.* 2023, 55, 102905, and *Resources, Cons. Recycl.* 2020, 155, 104662, each of which is incorporated by reference herein, though challenges remain. While hydrogen energy has significant advantages, it is essential to consider the challenges, such as production costs, infrastructure, and energy conversion efficiency; however, its potential for a sustainable energy future is promising.

Accordingly, one object of the present disclosure is to provide an efficient method for hydrogen generation using a nanocomposite catalyst that may circumvent the drawbacks and limitations, such as high cost, high lead times, low efficiency, and poor environmental performance of methods and materials known in the art.

SUMMARY

In an exemplary embodiment, a method of hydrogen generation is described. The method includes contacting sodium borohydride ($NaBH_4$) and water in the presence of a catalyst comprising a nanocomposite comprising graphitic $C_3N_4$, $Fe_2O_3$, and $MgAl_2O_4$ in a mass relationship to each other in a range of from 5 to 15: 2 to 7: 75 to 95, at a temperature in a range of from 10 to 80° C., thereby catalyzing the hydrogen generation at a hydrogen generation rate in a range of from 250 to 2500 mL/(min·g).

The average pore distribution of the nanocomposite may be bimodal. The BET specific surface area of the nanocomposite may be in a range of from 15 to 45 $m^2/g$ (23.88 $m^2/g$). A first average pore diameter of the first mode of the nanocomposite, according to BJH measurement method, may be in a range of from 6.3 to 10.03 nm (8.3 nm), with a second average pore diameter of the second mode of the nanocomposite, according to BJH measurement method, being in a range of from 7.5 to 13 nm (10.87 nm). An average pore volume of the nanocomposite, according to the BJH measurement method, is in a range of from 0.06 to 0.12 $cm^3/g$ (0.09 $cm^3/g$).

The nanocomposite may have a (311) spinel interplanar spacing in a range of from 0.210 to 0.290 nm (0.25 nm), a (006) $Fe_2O_3$ interplanar spacing in a range of from 0.180 to 0.260 nm (0.22 nm), a (400) spinel interplanar spacing in a range of from 0.140 to 0.220 nm (0.18 nm), a (220) MgO interplanar spacing in a range of from 0.108 to 0.188 (0.148 nm), a (620) spinel interplanar spacing in a range of from 0.090 to 0.170 (0.13 nm), and a (119) $Fe_2O_3$ and (622) $Fe_2O_3$ spinel interplanar spacing in a range of from 0.080 to 0.160 (0.12 nm), according to selected area diffraction.

The mass relationship of the nanocomposite may be in a range of from 9 to 11: 4 to 6: 84 to 86, wherein the nanocomposite has a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and a (119) $Fe_2O_3$ and (622) $Fe_2O_3$ spinel interplanar spacing of 0.12±2% nm, wherein an XRD spectrum of the nanocomposite under Cu-filtered CuKα radiation (1.5418 Å) powered at 45 kV and 10 mA has 2θpeaks of an $MgAl_2O_4$ spinel phase at 18.9±1, 31.7±1, 44.8±1, 56.2±1, 74.09±1, and/or 78.1±1°, an MgO cubic phase at 42.8±1, 62.2±1, and/or 74.6±1°, an $Fe_2O_3$ hexagonal phase at 36.9±1, 44.8±1, 59.6±1, and 67.3±1°, and/or g-$C_3N_4$-related diffractions at 27.8±1, 36.8±1, 44.6±1, and/or 67.3±1°, and wherein no more than 1% relative intensity $MgFe_2O_4$ (none) is detected in the XRD spectrum.

The high hydrogen generation rate in contacting sodium borohydride ($NaBH_4$) and the nanocomposite may be in a range of from 400 to 1500 mL/(min·g), e.g., 610±40, 33, 25, 20, 15, 10, 7.5, 5, 4, 3, 2, 1, or 0.5 mL/(min·g), and wherein the hydrogen generation rate in the contacting is in a range of from 2 to 8-fold that without the nanocomposite.

The carbon materials in the nanocomposite may comprise no more than inevitable traces of nanotubes, relative to total nanocomposite weight or total carbonaceous material weight (in the nanocomposite). For example, carbon materials in the nanocomposite may be less than 5, 4, 3.33, 2.5, 2, 1.5, 1, 0.75, 0.67, 0.5, 0.33, 0.25, 0.125, 0.1, 0.05, 0.01, 0.001, 0.0001, or 0.00001 wt. %, relative to total carbonaceous material (or nanocomposite) weight, of carbon nanotubes or tube-shape carbonaceous material.

The nanocomposite may comprise no more than 1, 0.5, 0.1, 0.01, 0.001, 0.0001, or 0.00001 wt. % of carbonaceous materials besides graphitic $C_3N_4$.

The nanocomposite may comprise no more than 1, 0.5, 0.1, 0.01, 0.001, 0.0001, or 0.00001 wt. % of sulfides, relative to total nanocomposite weight.

The nanocomposite may comprise no more than 0.5, 0.33, 0.25, 0.1, 0.01, 0.001, 0.0001, or 0.00001 wt. % of $Y_2O_3$. The nanocomposite may comprise no more than 5, 4, 3.33, 2.5, 2, 1.5, 1, 0.75, 0.67, 0.5, 0.33, 0.25, 0.125, 0.1, 0.05, 0.01, 0.001, 0.0001, or 0.00001 wt. %, individually or in any combination, of Ni, Co, Mn, Cu, and/or Ce, relative to total carrier weight.

The nanocomposite may comprise no more than 1, 0.5, 0.1, 0.01, 0.001, 0.0001, or 0.00001 wt. % elemental state Fe, relative to total nanocomposite weight.

Relative to total nanocomposite weight, the nanocomposite may comprises no more than 1, 0.5, 0.1, 0.01, 0.001, 0.0001, or 0.00001 wt. % elemental state metal, and/or no more than 1, 0.5, 0.1, 0.01, 0.001, 0.0001, or 0.00001 wt. % $Fe_3O_4$.

The nanocomposite may comprise no more than 1, 0.5, 0.1, 0.01, 0.001, 0.0001, or 0.00001 wt. % $MnO_2$, relative to total nanocomposite weight.

The nanocomposite may comprise no more than inevitable traces of a mercaptan, amine, and/or carboxylic acid functional groups. For example, the nanocomposite may contain no more than 5, 4, 3.33, 2.5, 2, 1.5, 1, 0.5, 0.1, 0.01, 0.001, 0.0001, or 0.00001 equivalents of mercaptan, amine, and/or carboxylic acid functional groups, individually or in total, per 1 mg of nanocomposite.

The nanocomposite may comprise no more than inevitable traces of C—N heterocycles (e.g., pyridine, NMP, etc.). The nanocomposite may comprise no more than inevitable traces of silyl functions. For example, the nanocomposite may contain no more than 5, 4, 3.33, 2.5, 2, 1.5, 1, 0.5, 0.1, 0.01, 0.001, 0.0001, or 0.00001 silyl equivalents per 1 mg of nanocomposite.

Relative to a total metal oxide weight, the nanocomposite may comprise no more than 10 wt. % MgO, and no more than 1, 0.5, 0.1, 0.01, 0.001, 0.0001, or 0.00001 wt. % $ZrO_2$.

The nanocomposite comprises no more than 10, 9, 8, 7.5, 7, 6, 5, 4, 3, 2.5, 2, 1, 0.5, 0.1, 0.01, 0.001, 0.0001, or 0.00001 wt. %, individually or in any combination, of ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4OsI_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and/or $LaFeO_3$.

The nanocomposite may comprise no more than 1, 0.5, 0.1, 0.01, 0.001, 0.0001, or 0.00001 wt. %, individually or in any combination, relative to total metal content, of any of Au, Zn, Ce, Gd, La, Ba, Ti, Ca, Sr, Zr, Pb, Ni, Ag, Co, Cu, Mn, Cd, Ta, Nb, Pr, and Bi. The nanocomposite may comprise no more than 1, 0.5, 0.1, 0.01, 0.001, 0.0001, or 0.00001 wt. %, individually or in any combination, relative to total carrier weight, of $SiO_2$, $TiO_2$, ZnO, and ZnS.

The nanocomposite may comprise no more than 5, 4, 3.33, 2.5, 2, 1.5, 1, 0.75, 0.67, 0.5, 0.33, 0.25, 0.125, 0.1, 0.05, or 0.01 at. % Fe(III) ions, relative to total iron atoms in the nanocomposite.

The nanocomposite may comprise no more than 1, 0.5, 0.1, 0.01, 0.001, 0.0001, or 0.00001 wt. %, individually or in any combination, of $SrTiO_3$, Au, $SnO_2$, and SnO.

The graphitic $C_3N_4$ has no more than 10, 9, 8, 7.5, 7, 6, 5, 4, 3, 2.5, 2, 1, 0.5, 0.1, 0.01, 0.001, 0.0001, or 0.00001%, based on its total volume, with a honeycomb structure.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
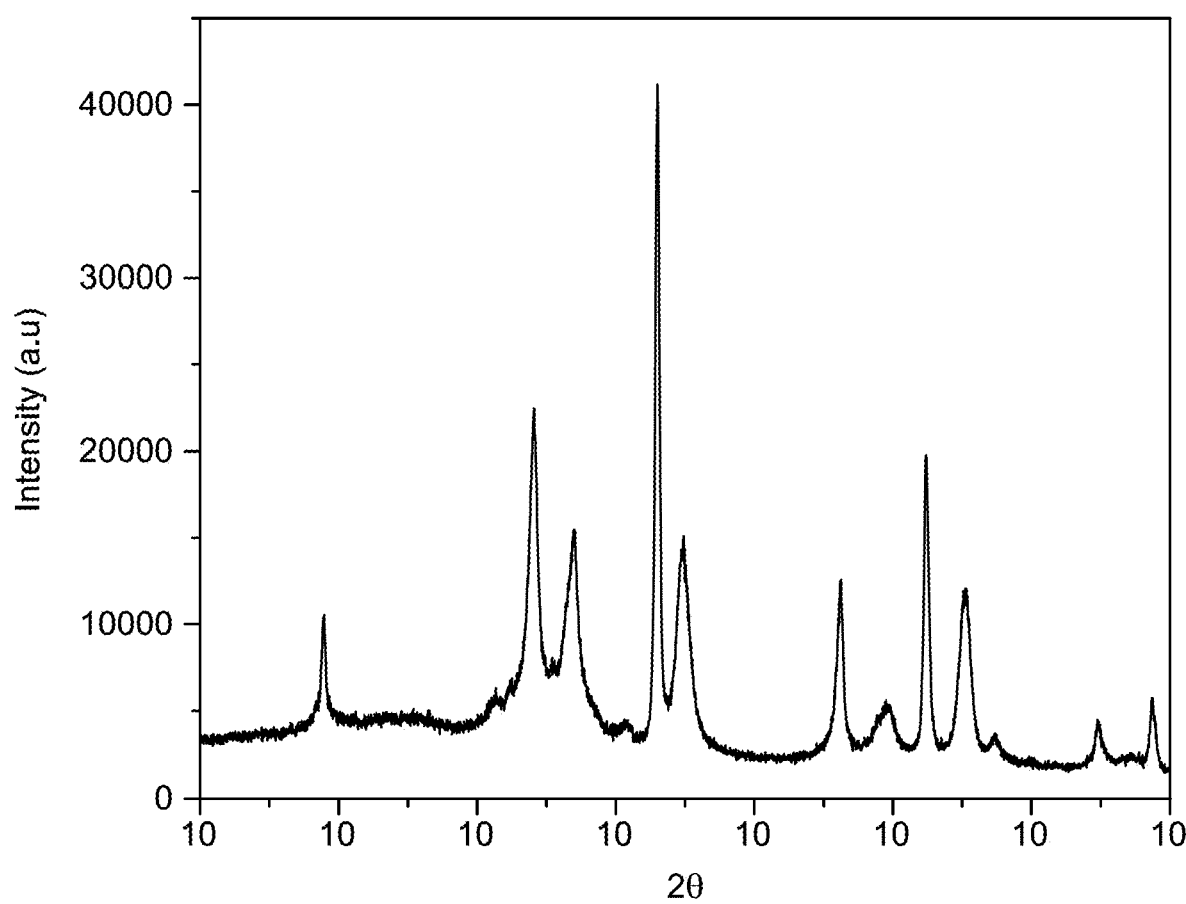
FIG. 1 is a graph depicting X-ray diffraction (XRD) patterns of an inventive 10% $g\text{-}C_3N_4@Fe_2O_3/MgAl_2O_4$ nanocomposite.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein, the term 'bimodal' refers to a material's pore structure where there are two distinct peaks in the distribution of pore sizes, meaning there are two separate populations of significantly different sized pores within the material, often categorized as "micropores" and "macropores" with a clear gap between them; essentially, a pore size distribution with two distinct modes or maxima on a graph representing the data.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a g-$C_3N_4$@$Fe_2O_3$/$MgAl_2O_4$ (10: 5: 85, wt. %) nanocomposite designed to function as a catalyst to enhance the hydrolysis of sodium borohydride (NaBH$_4$) for efficient production of hydrogen gas. The catalyst facilitates the safe and rapid release of hydrogen from water and NaBH$_4$, making it an efficient solution for clean hydrogen production. The present disclosure circumvents the drawbacks of prior art by addressing key limitations such as high catalyst costs, slow reaction rates, and environmental concerns. Traditional catalysts often require expensive materials and result in inefficient or slow hydrogen production. In contrast, the present disclosure uses a cost-effective catalyst that promotes faster hydrogen generation without relying on toxic or scarce materials. The simplicity of its preparation and its high catalytic activity also ensure scalability and practical applicability, without needing to apply potential or use electrodes, making it a more efficient and sustainable alternative to existing methods.

A nanocomposite is described. The nanocomposite includes graphitic $C_3N_4$, $Fe_2O_3$, and $MgAl_2O_4$. The mass relationship of graphitic $C_3N_4$, $Fe_2O_3$, and $MgAl_2O_4$ in the nanocomposite is in a range of from 5 to 15: 2 to 7: 75 to 95, preferably 6 to 10: 3 to 6: 80 to 90, preferably 9 to 11: 4 to 6: 84 to 86, and more preferably 10: 5: 85.

The nanocomposite contains g-$C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. In a preferred embodiment, the nanocomposite contains 10±2, 1.5, 1, 0.75, 0.67, 0.5, 0.33, 0.25, 0.125, 0.1, 0.05, or 0.01 wt. % of graphite-phase carbon nitride (g-$C_3N_4$). Graphitic $C_3N_4$ includes carbon nitride sheets that exhibit long-range two-dimensional crystalline order. In one embodiment, the graphitic $C_3N_4$ has no more than 10, 7.5, 5, 4, 3, 2, 1, 0.5, 0.1, 0.01, 0.001, 0.0001, or 0.00001%, based on its total volume, and has a honeycomb structure.

The nanocomposite contains $Fe_2O_3$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. In a preferred embodiment, the nanocomposite contains 5±1, 0.75, 0.67, 0.5, 0.33, 0.25, 0.125, 0.1, 0.05, or 0.01 wt. % of $Fe_2O_3$.

The nanocomposite contains magnesium aluminium oxide (MgAl$_2$O$_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. In a preferred embodiment, the nanocomposite contains 85±5, 4, 3.33, 2.5, 2, 1.5, 1, 0.75, 0.67, 0.5, 0.33, 0.25, 0.125, 0.1, 0.05, or 0.01 wt. % of magnesium aluminium oxide (MgAl$_2$O$_4$).

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 m, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

A Brunauer-Emmett-Teller (BET) specific surface area of the nanocomposite is in a range of from 15 to 45 square meters per gram ($m^2/g$), preferably 16 to 44 $m^2/g$, preferably 17 to 43 $m^2/g$, preferably 18 to 42 $m^2/g$, preferably 19 to 41 $m^2/g$, preferably 20 to 40 $m^2/g$, preferably 21 to 39 $m^2/g$, preferably 22 to 38 $m^2/g$, preferably 23 to 37 $m^2/g$, preferably 24 to 36 $m^2/g$, preferably 25 to 35 $m^2/g$, preferably 26 to 34 $m^2/g$, preferably 27 to 33 $m^2/g$, preferably 28 to 32 $m^2/g$, and preferably 29 to 31 $m^2/g$. In a preferred embodiment, the surface area of the nanocomposite is 23.88±5, 4, 3, 2.5, 2, 1.5, 1, 0.75, 0.5, 0.25, 0.2, or 0.1 $m^2/g$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. Pore diameter, pore volume, and BET surface area may be measured by gas adsorption analysis, preferably $N_2$ adsorption analysis (e.g., $N_2$ adsorption isotherms).

A first average pore diameter of the first mode of the nanocomposite, according to Barrett-Joyner-Halenda (BJH) measurement method, is in a range of from 6.3 to 10.03 nm, preferably 6.5 to 9.8 nm, preferably 6.7 to 9.6 nm, preferably 6.9 to 9.4 nm, preferably 7.1 to 9.2 nm, preferably 7.3 to 9.0 nm, preferably 7.5 to 8.8 nm, preferably 7.7 to 8.6 nm, preferably 7.9 to 8.4 nm, and preferably 8.1 to 8.2 nm, with a second average pore diameter of the second mode of the nanocomposite, according to BJH measurement method, being in a range of from 7.5 to 13 nm, preferably 8.0 to 12.5 nm, preferably 8.5 to 12.0 nm, preferably 9.0 to 11.5 nm, preferably 9.5 to 11.0 nm, and preferably 10.0 to 10.5 nm. In a preferred embodiment, the first average pore diameter of the first mode of the nanocomposite, according to BJH measurement method, is 8.3 nm, with a second average pore diameter of the second mode of the nanocomposite, according to BJH measurement method, being 10.87±1.5, 1, 0.75, 0.67, 0.5, 0.33, 0.25, 0.125, 0.1, 0.05, or 0.01 nm.

An average pore volume of the nanocomposite, according to the BJH measurement method, is in a range of from 0.06 to 0.12 $cm^3/g$, preferably 0.07 to 0.11 $cm^3/g$, preferably 0.08 to 0.10 $cm^3/g$, and preferably 0.09 $cm^3/g$. In a preferred embodiment, the average pore volume of the nanocomposite, according to the BJH measurement method, is 0.09±0.025, 0.01, 0.0075, 0.005, 0.0025, or 0.001 $cm^3/g$.

An average pore distribution of the nanocomposite may include, but is not limited to, crystalline average pore distribution, bimodal, trimodal, multimodal, narrow, broad and Gaussian. The average pore distribution of the nanocomposite may be bimodal. This bimodal pore structure suggests that the nanocomposite contains both smaller and larger pores, which may contribute to enhanced properties such as improved surface area, increased mechanical strength, or enhanced porosity for specific applications.

The nanocomposite may have a (311) spinel interplanar spacing in a range of from 0.210 to 0.290 nm, preferably 0.220 to 0.280 nm, preferably 0.230 to 0.270 nm, and preferably 0.240 to 0.260 nm, according to selected area diffraction (SAED). The nanocomposite may have a (006) $Fe_2O_3$ interplanar spacing in a range of from 0.180 to 0.260 nm, preferably 0.190 to 0.250 nm, preferably 0.200 to 0.240 nm, and preferably 0.210 to 0.230 nm, according to SAED. The nanocomposite may have a (400) spinel interplanar spacing in a range of from 0.140 to 0.220 nm, preferably 0.150 to 0.210 nm, preferably 0.160 to 0.200 nm, preferably 0.170 to 0.190 nm, according to SAED. The nanocomposite may have a (220) MgO interplanar spacing in a range of from 0.108 to 0.188 nm, preferably 0.118 to 0.178 nm, preferably 0.128 to 0.168 nm, and preferably 0.138 to 0.158 nm, according to SAED. The nanocomposite may have a (620) spinel interplanar spacing in a range of from 0.090 to 0.170, preferably 0.100 to 0.160 nm, preferably 0.110 to 0.150 nm, preferably 0.120 to 0.140 nm, according to SAED. The nanocomposite may have a (119) $Fe_2O_3$ and (622) $Fe_2O_3$ spinel interplanar spacing in a range of from 0.080 to 0.160, preferably 0.090 to 0.150 nm, preferably 0.100 to 0.140 nm, preferably 0.110 to 0.130 nm, according to SAED.

The nanocomposite may have a (311) spinel interplanar spacing of 0.25 nm, a (006) $Fe_2O_3$ interplanar spacing of 0.22 nm, a (400) spinel interplanar spacing of 0.18 nm, a (220) MgO interplanar spacing of 0.148 nm, a (620) spinel interplanar spacing of 0.13 nm, and/or a (119) $Fe_2O_3$ and (622) $Fe_2O_3$ spinel interplanar spacing of 0.12 nm, according to SAED.

The mass relationship of the nanocomposite may be in a range of from 9 to 11: 4 to 6: 84 to 86, preferably 10: 5: 85, wherein the nanocomposite has a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and/or a (119) $Fe_2O_3$ and (622) $Fe_2O_3$ spinel interplanar spacing of 0.12±2% nm.

An XRD spectrum of the nanocomposite under Cu-filtered Cu Kα radiation (1.5418 Å) powered at 45 kilovolts (kV) and 10 milliampere (mA) may have 2θpeaks of a $MgAl_2O_4$ spinel phase at 18.9±1, 31.7±1, 44.8±1, 56.2±1, 74.09±1, and/or 78.1±1°, a MgO cubic phase at 42.8±1, 62.2±1, and/or 74.6±1°, a $Fe_2O_3$ hexagonal phase at 36.9±1, 44.8±1, 59.6±1, and/or 67.3±1°, and/or g-$C_3N_4$-related diffractions at 27.8±1, 36.8±1, 44.6±1, and/or 67.3±1°. No more than 1%, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % relative intensity $MgFe_2O_4$ (or none) may be detected in the XRD spectrum. The minimal presence of $MgFe_2O_4$ (no more than 1% or none) in the nanocomposite is critical to maintaining its enhanced catalytic properties, high surface reactivity, and efficient adsorption. This ensures desired performance in environmental remediation, energy production, and biomedical applications, free from interference by less reactive $MgFe_2O_4$ phases.

The $Fe_2O_3$ in the nanocomposite may have a hexagonal crystal structure. In alternate or addition, $Fe_2O_3$ may exist in other crystal phases, including cubic, monoclinic, tetragonal, rhombohedral, and orthorhombic phases. The MgO may have a cubic phase. Alternatively or additionally, MgO may exist in other crystal phases, including hexagonal, monoclinic, tetragonal, rhombohedral, and orthorhombic phases.

$MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed 'normal'. Conversely, when tetrahedral sites are occupied by half of the $B^{3+}$ and octahedral sites by the other half along with $A^{2+}$, the spinel phase is termed 'inverse'.

$MgAl_2O_4$ has been widely used in various applications, such as in metallurgical, electrochemical, radio-technical, and chemical industrial fields owing to its high thermal stability (melting point at 2135 degrees Celsius (° C.), high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 30 and 1400° C., low dielectric constant, low density (3.58 gram per cubic centimeter ($g/cm^3$)), high thermal shock resistance, hydrophobicity, and low surface acidity.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbonaceous material besides the graphitic carbon nitride. A low concentration of carbonaceous material contributes to maintaining the desired structural integrity and functional properties of the nanocomposite. The minimal amount of additional carbon material prevents any significant interference with the performance of the graphitic carbon nitride, particularly in applications such as photocatalysis or energy storage, where the purity and specific properties of the $g$-$C_3N_4$ are crucial. In said embodiment, the carbon materials in the nanocomposite include no more than 0.01 wt. % (inevitable traces) nanotubes, relative to total nanocomposite weight.

The nanocomposite may include no more than 1, 0.75, 0.5, 0.25, 0.1, 0.01, 0.001, 0.0001, or 0.00001 wt. % of sulfides, relative to the total nanocomposite weight.

The nanocomposite may include no more than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, of $Y_2O_3$ relative to total carrier weight.

The nanocomposite may include no more than 5 wt. %, preferably 4 wt. %, preferably 3 wt. %, preferably 2 wt. %, preferably 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % of Ni, Co, Mn, Cu, or Ce, relative to total carrier weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, individually, relative to the total carrier weight, of $SiO_2$, $TiO_2$, ZnO, ZnS.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. %, individually or in any combination, relative to the total metal content, of any of Au, Zn, Ce, Gd, La, Ba, Ti, Ca, Sr, Zr, Pb, Ni, Ag, Co, Cu, Mn, Cd, Ta, Nb, Pr, and Bi. Excessive metal accumulation could negatively impact the nanocomposite's stability, reactivity, or selectivity. By limiting the metal content, the nanocomposite maintains a high level of performance in its intended applications, ensuring that the active sites of the carrier material remain unblocked or inhibited, thus enhancing its long-term durability, minimizing unwanted side reactions, and preserving its efficiency in processes like catalysis or energy conversion.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % elemental state metal, relative to total nanocomposite weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % Fe, relative to total nanocomposite weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % $Fe_3O_4$, relative to total nanocomposite weight.

The nanocomposite may include no more than 5 at. % Fe(III) ions, preferably less than 4 at. % Fe(III) ions, preferably less than 3 at. % Fe(III) ions, preferably less than 2 at. % Fe(III) ions, preferably less than 1 at. % Fe(III) ions, relative to the total iron atoms in the nanocomposite.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % $MnO_2$, relative to total nanocomposite weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt.

%, individually or in any combination, of $SrTiO_3$, Au, $SnO_2$, and/or SnO, relative to total nanocomposite weight.

Nanocomposite may include no more than 10 wt. % MgO, preferably less than 9 wt. % of MgO, preferably less than 8 wt. % of MgO, preferably less than 7 wt. % of MgO, preferably less than 6 wt. % of MgO, preferably less than 5 wt. % of MgO, preferably less than 4 wt. % of MgO, preferably less than 3 wt. % of MgO, preferably less than 2 wt. % of MgO, and preferably less than 1 wt. % relative to the total metal oxide weight.

The nanocomposite may include no more than 1, 0.5, 0.1, 0.01, 0.001, 0.0001, or 0.00001 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % $ZrO_2$, relative to the total metal oxide weight.

The nanocomposite may include no more than 10 wt. %, preferably less than 9 wt. %, preferably less than 8 wt. %, preferably less than 7 wt. %, preferably less than 6 wt. %, preferably less than 5 wt. %, preferably less than 4 wt. %, preferably less than 3 wt. %, preferably less than 2 wt. %, preferably less than 1 wt. %, individually or in any combination, of ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$(x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$(0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}—Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4OsI_2$, $SrFe_{0.5}Ta_{0.5}O_3$, $La_{0.5}Ba_{0.2}TiO_{3.5-\delta}$, $LaTiO_{3.5-\delta}$, $NaNbO_3$, and/or $LaFeO_3$.

The nanocomposite may include no more than inevitable traces of a mercaptan, amine, and/or carboxylic acid functional groups. The nanocomposite includes no more than inevitable traces of C—N heterocycles (pyridine), and inevitable traces of silyl functions. As used herein, "inevitable traces" refer to less than 0.1, 0.01, 0.001, 0.0001, or 0.00001% by wt. of a mercaptan, amine, and/or carboxylic acid functional group relative to total nanocomposite weight.

The minimal presence or absence of each of these elements/compounds, in aforementioned embodiments, in the nanocomposite ensures desired performance in environmental remediation, energy production, and biomedical applications, free from interference by other phases in the nanocomposite.

A method of hydrogen generation using the nanocomposite may include contacting sodium borohydride ($NaBH_4$) and water in the presence of a catalyst comprising a nanocomposite including graphitic $C_3N_4$, $Fe_2O_3$, and $MgAl_2O_4$ in a mass relationship to each other in a range of from 5 to 15: 2 to 7: 75 to 95, at a temperature in a range of from 10 to 80° C., thereby catalyzing the hydrogen generation at a hydrogen generation rate in a range of from 250 to 2500±250, 200, 150, 100, 75, 50, 25, 15, 10, 5, 2.5, or 1 L/(min·g).

The method of contacting (e.g., sodium) borohydride(s) with the nanocomposite is performed at a temperature range of 20 to 70° C., preferably 25 to 65° C., preferably 30 to 60° C., preferably 35 to 55° C., preferably 40 to 50° C., preferably 40 to 45° C., more preferably at about 40° C. for a period of 1 to 60 minutes, preferably 5 to 10 minutes.

Other borohydride salts such as lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper(II) borohydride, thallium borohydride, gold borohydride, silver borohydride, rhodium borohydride, palladium borohydride, antimony borohydride, and/or combinations thereof may also or alternatively be used.

The hydrogen is generated at a hydrogen generation rate ranging from 400 to 1500 mL/min per gram, with specific intervals of 500 to 1200 mL/min per gram, 550 to 1000 mL/min per gram, 600 to 800 mL/min per gram, 600 to 700 mL/min per gram, 600 to 650 mL/min per gram of the nanocomposite. In a preferred embodiment, hydrogen is generated at a hydrogen generation rate of 610 mL/min per gram of the nanocomposite.

In one embodiment, contacting the sodium borohydride with water in the presence of the nanocomposite generates 2 to 8-fold more hydrogen in comparison to contacting the sodium borohydride with water in the absence of the nanocomposite after 5 minutes.

The following examples are provided solely for illustration and are not to be construed as limitations of the present disclosure, as many variations thereof are possible without departing from the spirit and scope of the present disclosure.

EXAMPLES

The following examples demonstrate a method of hydrogen generation via a nanocomposite as synthesized herein. The examples are provided solely for illustration and are not to be construed as limitations of the present disclosure, as many variations thereof are possible without departing from the spirit and scope of the present disclosure.

Example 1: Fabrication of g-$C_3N_4$@$Fe_2O_3$/$MgAl_2O_4$(10:5:85, wt. %) nanocomposite According to the present disclosure, magnesium nitrate, and aluminum nitrate were added together in one beaker with iron nitrate amounts proper (here, stoichiometric) to produce a 10% $Fe_2O_3$@$MgAl_2O_4$. About 10 g of dextrose as fuel was added to the beaker, followed by 30 mL of distilled water. The beaker was heated till a clear solution was obtained, then heated further till dryness. The product was ground in a mortar, transferred to a 150 mL porcelain dish, and calcined at 700° C. for 3.0 hours. Then after, the 10% $Fe_2O_3$@$MgAl_2O_4$ product was cooled down to room temperature and weighed, then ground with urea amount suitable (here, 2 g urea to 20 g of the 10% $Fe_2O_3$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $Fe_2O_3$/$MgAl_2O_4$, and optionally no more than 100,000, 50,000, 25,000, 10,000, 5,000, 1,000, 750, 500, 400, 333, 250, 125, 100, 75, 50, 25, 20, 15, or 10 parts by weight urea to 100 parts) to produce g-C3N4@$Fe_2O_3$/$MgAl_2O_4$(10: 5: 85, wt %) nanocomposite. The quadruple mixture was returned and heated to 600° C. for 40.0 min in a covered porcelain crucible and cooled to room temperature; then after, the g-$C_3N_4$@$Fe_2O_3$/$MgAl_2O_4$ (10: 5: 85, wt %) nanocomposite was collected.

Results and Discussion

The crystallinity and phase identification present in $Fe_2O_3$/$MgAl_2O_4$/g-$C_3N_4$ catalyst were analyzed by XRD, and the results are given in FIG. 1. The intense peaks show that the powders are highly crystalline. Matching the diffraction patterns with the standard JCPDS cards reveals the presence of $Fe_2O_3$, MgO, $MgAl_2O_4$, and g-$C_3N_4$ phases. The diffractions of the $MgAl_2O_4$ spinel were observed at 2θ values of 18.9, 31.7, 44.8, 56.2, 74.09, and 78.1. According to the standard COD card no. 9001364, these diffractions respectively came from (111), (220), (400), (422), (620) and (622) planes. Cubic phase of MgO (COD card, No. 9000499) was observed at 2θvalues of 42.8, 62.2, and 74.6°. These lines correspond to (200), (220), and (311) planes. The presence of MgO together with the $MgAl_2O_4$ spinel phase was also previously reported, as described in Kumar, et al. *Sust. Energy Techn. Assess.* 2023, 55, 102905, which is incorporated by reference herein. The diffraction lines observed at 36.9, 44.8, 59.6, and 67.3° are well-matched with the hexagonal phase of $Fe_2O_3$ (COD No. 1532120). The diffractions related to g-$C_3N_4$ was observed at 27.8, 36.8, 44.6, and 67.3° (COD No. 1534042). No other phases were detected (like $Al_2O_3$ or $MgFe_2O_4$) indicating the successful fabrication of $Fe_2O_3$/$MgAl_2O_4$/g-$C_3N_4$. On the other hand, the calculated lattice parameters for each phase was also calculated and were found to be for spinel (a=8.07410 Å), $Fe_2O_3$(a=4.83840 Å and c=12.61127 Å), for MgO (a=4.20729 Å), and finally for g-$C_3N_4$(a=6.84283 Å).

Figure 2A:
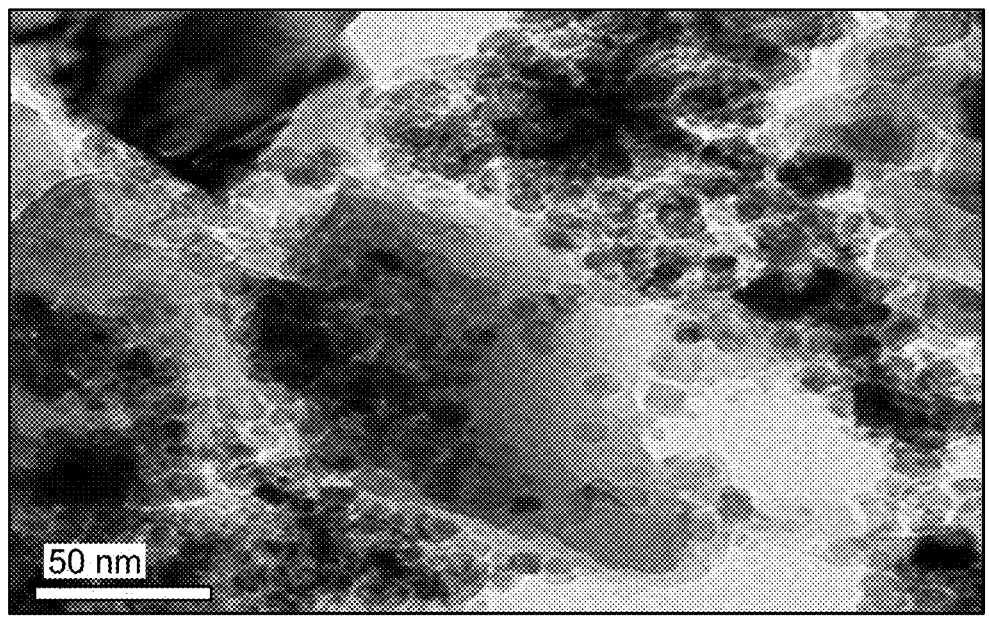
FIG. 2A and FIG. 2C show transmission electron microscopy (TEM) images of an inventive 10% $g\text{-}C_3N_4@Fe_2O_3/MgAl_2O_4$ nanocomposite, at different magnifications.
Figure 2B:
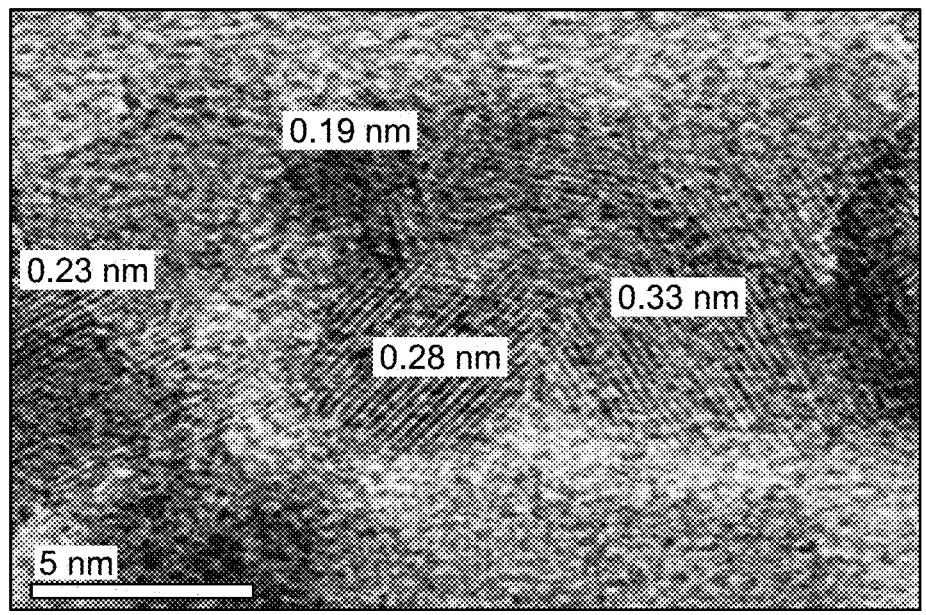
FIG. 2B is a high-resolution transmission electron microscopy (HRTEM) image of an inventive 10% $g\text{-}C_3N_4@Fe_2O_3/MgAl_2O_4$ nanocomposite.
Figure 2C:
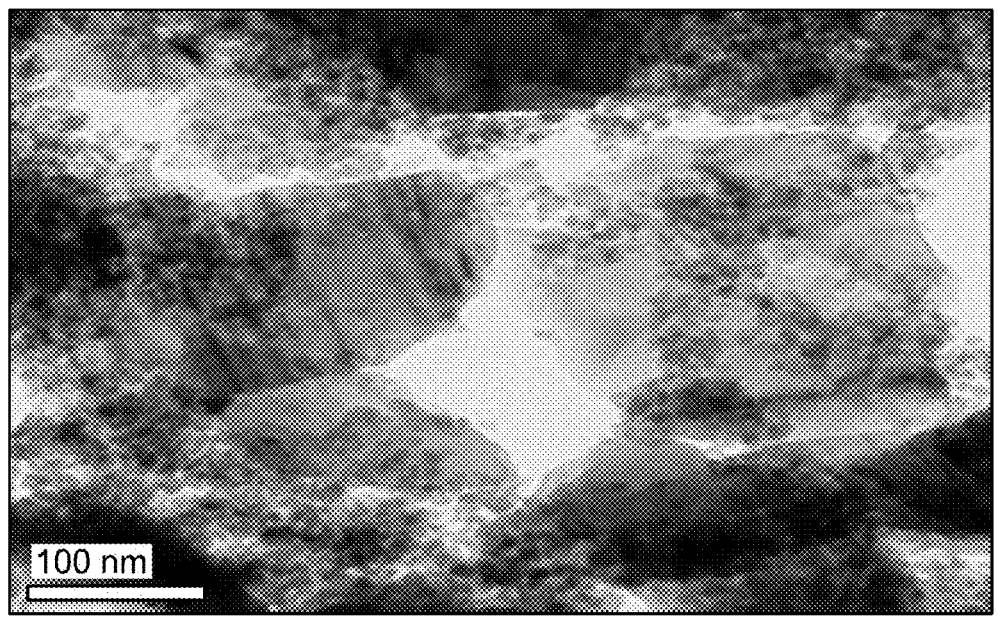
Figure 2D:
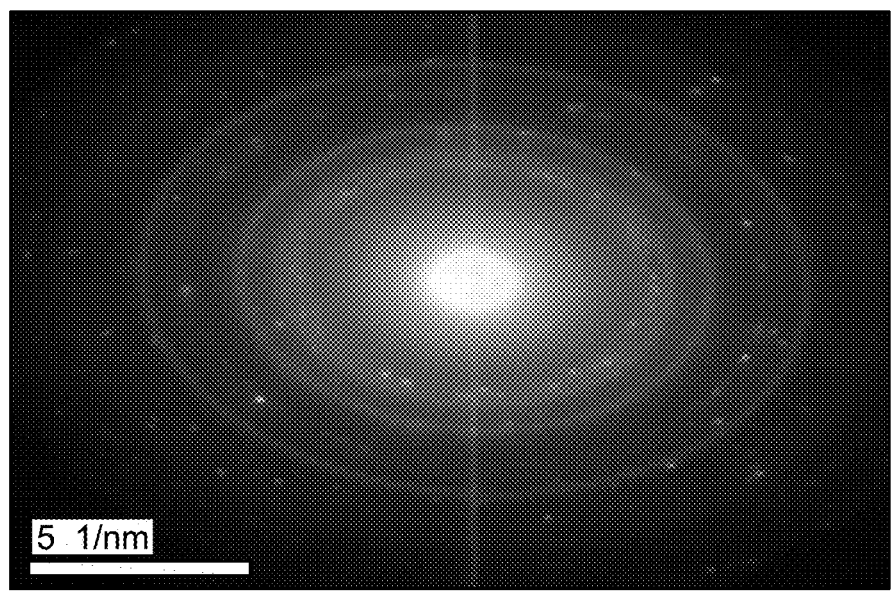
FIG. 2D is a selected area electron diffraction (SAED) pattern of an inventive 10% $g\text{-}C_3N_4@Fe_2O_3/MgAl_2O_4$ nanocomposite.

TEM images of g-$C_3N_4$@$Fe_2O_3$/$MgAl_2O_4$ nanocomposite were presented in FIG. 2A and FIG. 2C. The TEM images showed that well dispersion of homogeneous spherical metal oxides nanoparticles with size 7 nm on two-dimensional porous structure constructed with curled nanosheets and platelets of the g-$C_3N_4$. The corresponding SAED pattern reveals diffraction spots with interplanar spacing of 0.25, 0.22, 0.18, 0.148, 0.13 nm, and 0.12 nm due to (311, spinel), (006, $Fe_2O_3$), (400, spinel), (220, MgO), (620, spinel), and (119, $Fe_2O_3$; 622, spinel) diffraction planes (FIG. 2D). The corresponding HRTEM of the composite shows a plane spacing of 0.33 nm related to the (002) of CN, where 0.28 nm and 0.19 nm related to (220), and (400) planes of spinel, and 0.24 nm related to (110) plane of $Fe_2O_3$, characterizing the heterostructure formation (FIG. 2B).

Figure 3:
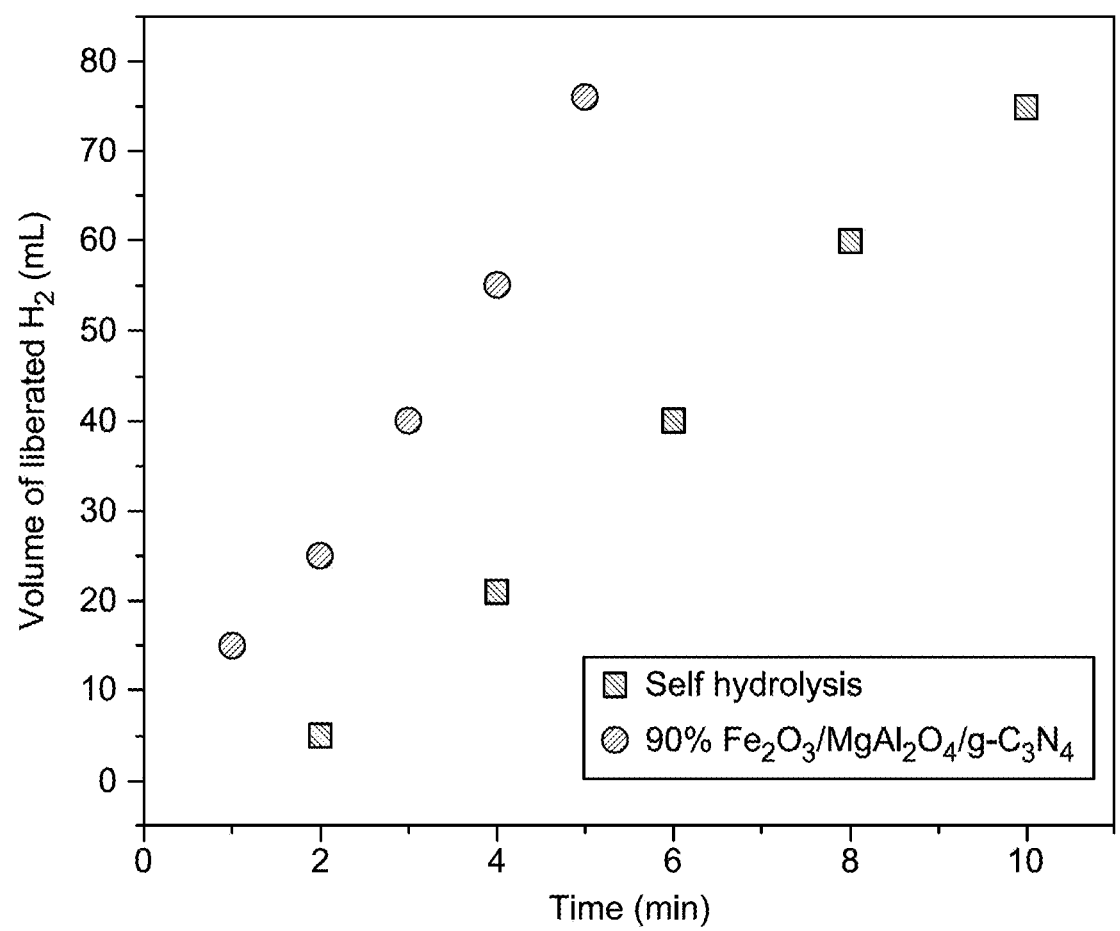
FIG. 3 shows the variation of volume of liberated $H_2$ with reaction time over an inventive $g\text{-}C3N_4@Fe_2O_3/MgAl_2O_4$ (10: 5: 85, wt. %) nanocomposite at a temperature of 40° C.

The aspects of the present disclosure describe a g-$C_3N_4$@$Fe_2O_3$/$MgAl_2O_4$ as a catalyst with a high hydrogen generation rate (HGR) that can hydrolyze sodium borohydride into pure, clean hydrogen ($H_2$) in a matter of minutes. It was made with inexpensive materials and was easily manufactured. A low-weight, stable, and safe hydrogen storage material with a high hydrogen storage capacity of 10.8 weight percent is sodium borohydride ($NaBH_4$). Hydrogen ($H_2$) has become one of the most remarkable energy carriers among renewable sources due to its high energy density (120 MJ/kg), non-toxicity, and environmental friendliness. The nanocomposite of the present disclosure, $Fe_2O_3$/$MgAl_2O_4$/g-$C_3N_4$, which has a high hydrogen production rate and can hydrolyze sodium borohydride into pure and clean hydrogen in a matter of minutes. FIG. 3 displays the hydrolysis of $NaBH_4$ at a reaction temperature of 40° C. both with and without a catalyst/nanocomposite. The synthesized composite demonstrated catalytic activity greater than the self-hydrolysis process, demonstrating the manufactured catalyst's catalytic action, which was plainly visible. The results further show that the catalyst offers an HGR of 610 mL/(min·g) at a temperature of 40° C.

Numerous modifications and variations of the present disclosure are possible in light of the above teachings. It is therefore to be understood that within the scope of the appended claims, the invention may be practiced otherwise than as specifically described herein.

The invention claimed is:

1. A method of hydrogen generation, the method comprising:
   contacting sodium borohydride ($NaBH_4$) and water in the presence of a catalyst comprising a nanocomposite comprising graphitic $C_3N_4$, $Fe_2O_3$, and $MgAl_2O_4$ in a mass relationship to each other in a range of from 5 to 15: 2 to 7: 75 to 95, at a temperature in a range of from 10 to 80° C., thereby catalyzing the hydrogen generation.

2. The method of claim 1, wherein the aver-age pore size distribution of the nanocomposite is bimodal, and
   wherein a BET specific surface area of the nanocomposite is in a range of from 15 to 45 $m^2$/g, and/or
   wherein a first average pore diameter of the first mode of the nanocomposite, according to BJH measurement method, is in a range of from 6.3 to 10.03 nm, with a second average pore diameter of the second mode of the nanocomposite, according to BJH measurement method, being in a range of from 7.5 to 13 nm, and/or
   wherein an average pore volume of the nanocomposite, according to the BJH measurement method, is in a range of from 0.06 to 0.12 $cm^3$/g.

3. The method of claim 1, wherein the nanocomposite has a (311) spinel interplanar spacing in a range of from 0.210 to 0.290 nm, a (006) $Fe_2O_3$ interplanar spacing in a range of from 0.180 to 0.260 nm, a (400) spinel interplanar spacing in a range of from 0.140 to 0.220 nm, a (220) MgO interplanar spacing in a range of from 0.108 to 0.188, a (620) spinel interplanar spacing in a range of from 0.090 to 0.170 nm, and a (119) $Fe_2O_3$ and (622) $Fe_2O_3$ spinel interplanar spacing in a range of from 0.080 to 0.160 nm, according to selected area diffraction.

4. The method of claim 1, wherein the mass relationship of the nanocomposite is in a range of from 9 to 11: 4 to 6: 84 to 86,
   wherein the nanocomposite has a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and a (119) $Fe_2O_3$ and (622) $Fe_2O_3$ spinel interplanar spacing of 0.12±2% nm,
   wherein an XRD spectrum of the nanocomposite under Cu-filtered CuKα radiation at a wavelength of 1.5418 Å, powered at 45 kV and 10 mA has 2θpeaks of
   an $MgAl_2O_4$ spinel phase at 18.9±1, 31.7±1, 44.8±1, 56.2±1, 74.09±1, and 78.1±1°,
   an MgO cubic phase at 42.8±1, 62.2±1, and 74.6±1°,
   an $Fe_2O_3$ hexagonal phase at 36.9±1, 44.8±1, 59.6±1, and 67.3±1°, and
   g-$C_3N_4$-related diffractions at 27.8±1, 36.8±1, 44.6±1, and 67.3±1°, and
   wherein no more than 1% relative intensity $MgFe_2O_4$ is detected in the XRD spectrum.

5. The method of claim 1, wherein carbon materials in the nanocomposite comprise no nanotubes.

6. The method of claim 1, wherein the nanocomposite comprises no more than 1 wt. % of carbonaceous materials besides the graphitic $C_3N_4$ relative to a total weight of the nanocomposite.

7. The method of claim 1, wherein the nanocomposite comprises no more than 1 wt. % of sulfides, relative to a total weight of the nanocomposite.

8. The method of claim 1, wherein the nanocomposite comprises no more than 1 wt. % elemental state Fe, relative to a total weight of the nanocomposite.

9. The method of claim 1, wherein, relative to total nanocomposite weight, the nanocomposite comprises
no more than 1 wt. % elemental state metal, and
no more than 1 wt. % $Fe_3O_4$ relative to a total weight of the nanocomposite.

10. The method of claim 1, wherein the nanocomposite comprises no more than 1 wt. % $MnO_2$, relative to a total weight of the nanocomposite.

11. The method of claim 1, wherein the nanocomposite comprises no mercaptan, amine, and/or carboxylic acid functional groups.

12. The method of claim 1, wherein the nanocomposite comprises no C—N heterocycles, and
the nanocomposite comprises no silyl functions.

13. The method of claim 1, wherein, relative to a total metal oxide weight, the nanocomposite comprises
no more than 10 wt. MgO, and
no more than 1 wt. % $ZrO_2$.

14. The method of claim 1, wherein the nanocomposite comprises no more than 10 wt. %, individually, of ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$(x=0.0, 0.6, or 1.0), Ag, $CoFe_2O_4$, $CuFe_2O_4$, $MnFe_2O_4$, $NiFe_2O_4$, $ZnFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}$(Co, Ni, $Zn)_{0.7}Fe_2O_4$, $LaCo_{0.5}Fe_{0.5}O_3$, $Mg_{0.1}$—$Co_{0.9}Fe_2O_4$, $Gd_2FeCrO_6$, $KTaO_3$, $NaTaO_3$, $NaNbO_3$, $KNbO_3$, $Mg_{1-x}Ni_xFe_2O_4$, $Pr_2Ti_2O_7$, $SiO_2$, $TiO_2$, ZnO, ZnS, $Bi_4O_5I_2$, $SrFe_{0.5}Ta_{0.5}O_3$, $NaNbO_3$, and $LaFeO_3$ relative to a total weight of the nanocomposite.

15. The method of claim 1, wherein the nanocomposite comprises no more than 1 wt. %, individually, of $SrTiO_3$, Au, $SnO_2$, and SnO relative to a total weight of the nanocomposite.

* * * * *